US011975842B2

(12) United States Patent
Parker et al.

(10) Patent No.: US 11,975,842 B2
(45) Date of Patent: May 7, 2024

(54) BOTTOM PAN TORQUE BEARING ATTACHMENT (71) Applicant: Safran Seats USA LLC, Gainesville, TX (US)

(72) Inventors: Charles Michael Parker, Irvine, CA (US); Reza Mansouri, Costa Mesa, CA (US); Gokul Ramarathnam, Irvine, CA (US); Romain Tranier, Costa Mesa, CA (US)

(73) Assignee: Safran Seats USA LLC, Gainesville, TX (US)

( * ) Notice: Subject to any disclaimer, the term of this patent is extended or adjusted under 35 U.S.C. 154(b) by 250 days.

(21) Appl. No.: 17/640,048

(22) PCT Filed: Sep. 30, 2019

(86) PCT No.: PCT/US2019/053768
§ 371 (c)(1),
(2) Date: Mar. 3, 2022

(87) PCT Pub. No.: WO2021/066792
PCT Pub. Date: Apr. 8, 2021

(65) Prior Publication Data
US 2022/0340282 A1 Oct. 27, 2022

(51) Int. Cl.
*B60N 2/12* (2006.01)
*B60N 2/22* (2006.01)
*B64D 11/06* (2006.01)

(52) U.S. Cl.
CPC ............. *B64D 11/064* (2014.12); *B60N 2/12* (2013.01); *B60N 2/2209* (2013.01); *B64D 11/0648* (2014.12)

(58) Field of Classification Search
CPC ........ B60N 2/045; B60N 2/12; B60N 2/2209; B64D 11/064; B64D 11/0648
USPC .............................. 297/322, 341, 342, 440.22
See application file for complete search history.

(56) References Cited

U.S. PATENT DOCUMENTS 4,580,839 A * 4/1986 Hatte ..................... A47C 5/02
297/440.22
5,133,587 A * 7/1992 Hadden, Jr. ........ B60N 2/42709
297/146
5,984,417 A * 11/1999 Wang .................. A47B 17/003
297/440.22

(Continued)

FOREIGN PATENT DOCUMENTS

EP 1116652 A2 7/2001

OTHER PUBLICATIONS

International Patent Application No. PCT/US2019/053768, International Search Report and Written Opinion, dated Jun. 2, 2020.

*Primary Examiner* — Rodney B White
(74) *Attorney, Agent, or Firm* — Kilpatrick Townsend & Stockton LLP (57) ABSTRACT Described are torque bearing assemblies for passenger seats. A torque bearing attachment (122, 222, 322, 422) includes an elongated body having a forward edge configured to mate with an aft end (140) of a seat bottom pan (120), and first and second side edges having attachment elements (136) for connecting the assembly with a passenger seat frame (108). The first and second side edges can be positioned orthogonal to the forward edge and at opposite ends of the elongated body with respect to each other.

20 Claims, 6 Drawing Sheets (56) References Cited

U.S. PATENT DOCUMENTS

| | | | | |
|---|---|---|---|---|
| 6,494,536 B2 * | 12/2002 | Plant | B60N 3/063 | |
| | | | 297/284.11 | |
| 6,550,863 B2 * | 4/2003 | Dill | B60N 2/1842 | |
| | | | 297/340 | |
| 6,641,214 B2 * | 11/2003 | Veneruso | B60N 2/0252 | |
| | | | 297/343 | |
| 6,688,691 B2 * | 2/2004 | Marechal | B64D 11/0643 | |
| | | | 297/325 | |
| 6,742,840 B2 * | 6/2004 | Bentley | B60N 2/995 | |
| | | | 297/316 | |
| 7,699,400 B2 * | 4/2010 | Speh | B64D 11/0649 | |
| | | | 297/452.18 | |
| 8,272,694 B2 * | 9/2012 | Hawkins | B64D 11/06 | |
| | | | 297/341 | |
| 8,439,435 B2 | 5/2013 | Gaither et al. | | |
| 8,616,631 B2 * | 12/2013 | Westerink | B64D 11/064 | |
| | | | 297/188.1 | |
| 8,733,840 B2 * | 5/2014 | Westerink | B64D 11/064 | |
| | | | 297/316 | |
| 8,783,771 B2 * | 7/2014 | Oleson | B64D 11/0641 | |
| | | | 297/318 | |
| 8,827,365 B2 * | 9/2014 | Gaither | B64D 11/06 | |
| | | | 297/316 | |
| 9,573,688 B2 * | 2/2017 | Pozzi | B64D 11/0648 | |
| 9,771,155 B2 * | 9/2017 | Zheng | B60N 2/686 | |
| 9,994,321 B2 * | 6/2018 | Murnan | B64D 11/06 | |
| 10,053,219 B2 | 8/2018 | Braca et al. | | |
| 10,207,808 B2 * | 2/2019 | Zheng | B64D 11/064 | |
| 10,525,851 B2 * | 1/2020 | Huang | B60N 2/68 | |
| 10,689,119 B2 * | 6/2020 | Pinger | B64D 11/0642 | |
| 10,814,986 B2 * | 10/2020 | Stachel | B64D 11/0648 | |
| 2008/0164742 A1 * | 7/2008 | Crowe | A47C 15/002 | |
| | | | 297/440.14 | |
| 2008/0169694 A1 * | 7/2008 | Speh | B64D 11/064 | |
| | | | 297/300.1 | |
| 2010/0253129 A1 * | 10/2010 | Dowty | B64D 11/06395 | |
| | | | 297/85 M | |
| 2010/0308167 A1 * | 12/2010 | Hawkins | B60N 2/2209 | |
| | | | 244/122 R | |
| 2018/0215469 A1 | 8/2018 | Uriu et al. | | |
| 2019/0092476 A1 * | 3/2019 | Gross | B64D 11/0696 | |
| 2020/0247546 A1 * | 8/2020 | Wong | B64D 11/0647 | |
| 2022/0297578 A1 * | 9/2022 | Kim | B60N 2/065 | |

* cited by examiner

BOTTOM PAN TORQUE BEARING ATTACHMENT

FIELD OF THE INVENTION

The field of the invention relates to passenger seats.

BACKGROUND

In commercial aircraft, seats are designed to meet the needs of passenger safety and comfort, while accounting for strict limitations on weight and space. In existing aircraft designs, passenger seats are designed with rigid supportive structures to meet safety criteria, typically including rigid seat pans that provide a supportive seating surface for passengers. Modern seat assemblies, however, are becoming more complex with time and require increased strength to incorporate improved safety features and articulation; although the driving concerns of passenger support, cost, and weight remain the same. To that end, improved structural performance solutions in seat assemblies, including seat pans, are needed.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a torque bearing attachment for a passenger seat can include an elongated body formed of a hollow conduit, a flat upper surface, and a concave lower surface. The torque bearing attachment can include a first bearing element configured for connecting the torque bearing attachment with a passenger seat frame and connected with the elongated body at a first end of the elongated body, and a second bearing element configured for connecting the torque bearing attachment with the passenger seat frame and connected with the elongated body at a second end of the elongated body opposite the first end. The torque bearing attachment can further include one or more connecting features positioned at a forward edge of the elongated body between the first end and second end, such as a channel, configured to receive an aft end of a seat bottom panel.

According to certain embodiments of the present invention, a passenger seat can include a seat frame connected with a seat bottom assembly formed by connecting a seat bottom panel with any suitable embodiment of a torque bearing attachment as described herein. According to various embodiments, a torque bearing attachment can include an elongated body formed of a hollow conduit, a flat upper surface, and a concave lower surface, which may be extruded. The torque bearing element can include a first bearing element at a first end of the elongated body connecting the torque bearing attachment with the seat frame, and a second bearing element at a second end of the elongated body opposite the first end and also connecting the torque bearing attachment with the seat frame.

According to certain embodiments of the present invention, a method of installing a seat bottom assembly in a passenger seat can include, with any suitable embodiments of the torque bearing attachments described herein, partially inserting a planar seat bottom panel into the channel of the forward edge of the elongated body of the torque bearing assembly to form a seat bottom assembly. The assembled torque bearing attachment and seat bottom panel can be assembled with a frame of the passenger seat by attaching the first and second bearing elements thereof with respective receiving element connected to the frame and by attaching the second bearing element with a second receiving element connected to the frame. The seat bottom assembly can be further connected with the frame at a forward end by connecting respective forward bearing element and forward receiving elements. In some embodiments, the seat bottom assembly can be further connected with an articulating seat back by connecting one or more mechanical linkages between a lower extent of the seat back and one or more attachment elements of the torque bearing attachment.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide for a torque bearing assembly for the seat bottom assemblies of passenger seats, in the form of a torque bearing attachment that mates with a seat bottom panel to form an aft portion of the seat bottom assembly. The torque bearing assemblies can improve the strength and resilience of the seat bottom assemblies by adding structural strength to the back end of a seat bottom pan, including the portions of the seat bottom pan where load-bearing elements or bearings mate with the seat frame and/or with the seat back, and where the seat bottom assemblies may be vulnerable to stresses caused by other adjacent passengers (e.g., when used as a step). Various embodiments of the torque bearing assemblies may be formed to mate interchangeably with different seat bottom panels, and may differ in shape in order to accommodate seats that require differing amounts of clearance underneath the seat bottom assembly. While the torque bearing assemblies are discussed for use with aircraft seats, they are by no means so limited. Rather, embodiments of the torque bearing assemblies may be used in passenger seats or other seats of any type or otherwise as desired.

Figure 1:
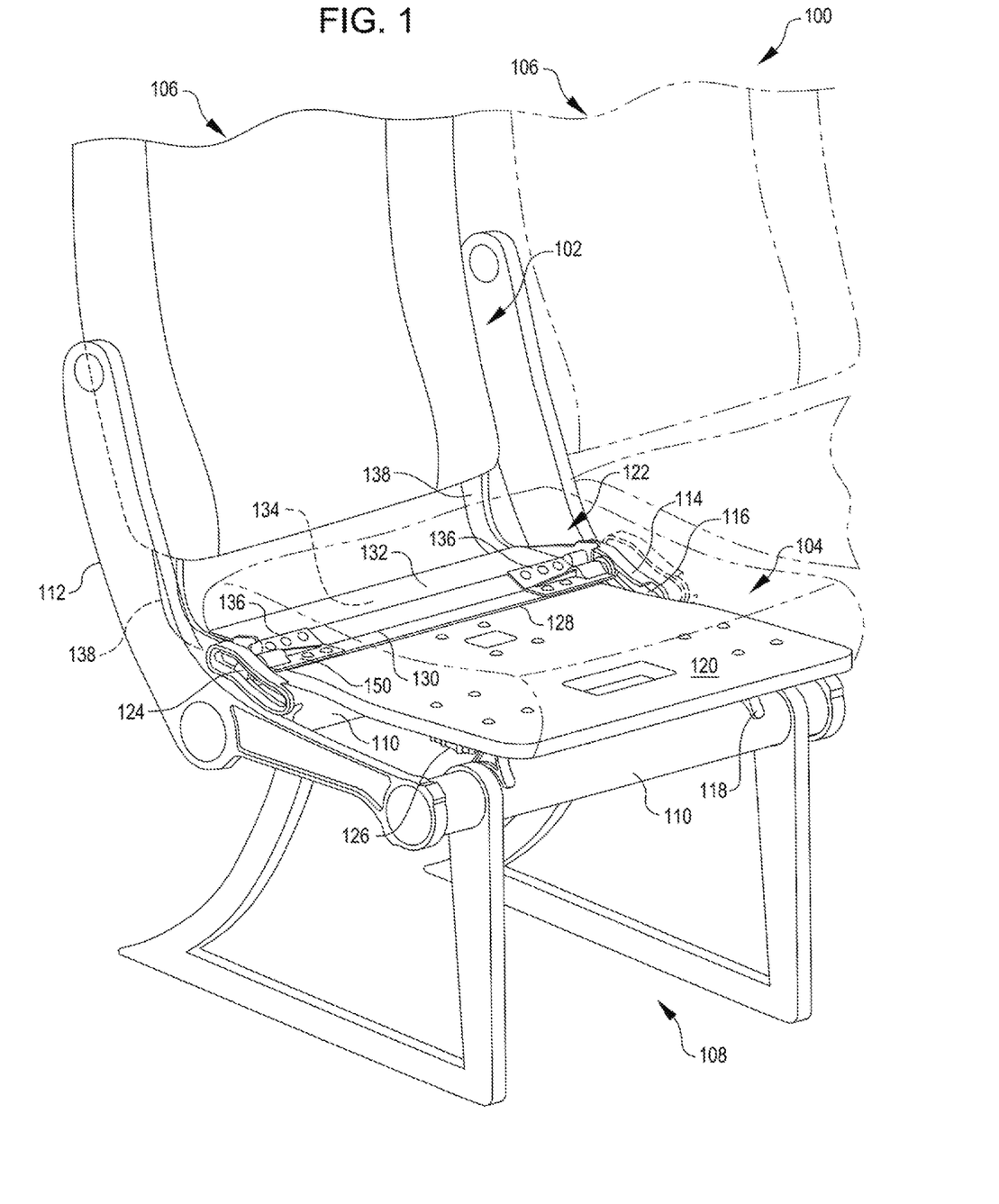
FIG. 1 is a perspective view of a seating arrangement including a passenger seat having a torque bearing seat pan assembly connected with a seat bottom panel, according to certain embodiments of the present disclosure.

According to certain embodiments of the present invention, as shown in FIG. 1, a passenger seat assembly 100 can include one or more passenger seats 102. Each passenger seat 102 includes a seat bottom assembly 104 and a seat back assembly 106 supported by a seat frame 108 that is connectable with structural elements of a passenger cabin. The seat frame 108 can include a set of supportive structural tubes 110 (or comparable elements) that can support the load-bearing parts of the passenger seat 102, e.g., the seat bottom assembly 104, spreaders 112, and by extension the seat back assembly 106. Specific attachment means may vary, but in general, the seat bottom assembly 104 can be supported by connection with the structural tubes 110 and/or the spreaders 112.

The seat bottom assembly 104 can include a seat bottom panel 120 that forms much or most of the supportive area thereof. The seat bottom panel 120 is connected to the torque bearing attachment 122 by inserting an aft end of the seat bottom panel into a channel 128 in a forward edge of the torque bearing assembly, where it can be fixed in place by, e.g., connectors (such as bolts, screws, or the like), adhesive, or any other suitable connecting means. The torque bearing attachment 122 includes an elongated body 130 that has a hollow, truss-like cross section, an aft platform 132 formed by an extension of the elongated body, and one or more reinforced bearing assemblies 150 that are attached to the elongated body 130. The reinforced bearing assemblies 150 can include attachment features for connecting the seat bottom assembly 104 with the frame 108. The underside of the torque bearing attachment 122, opposite the aft platform 132, can be a substantially concave surface 134 that may be curved or formed of flat panels meeting at an angle so that the concave surface provides clearance over other structural features of the passenger seat 102 such as the structural tubes 110.

In at least one embodiment, the seat bottom assembly 104 is movably attached with the frame 108 by way of a pair of aft bearing elements 124 connected to the reinforced bearing assemblies 150. The aft bearing elements 124 are connected with a pair of aft support assemblies 114 that contain arcuate tracks 116 into which the aft bearings are configured to roll forward and aft. The seat bottom assembly 104 can also be connected near a forward end thereof by a set of tracked ramps 126 that slidingly mate with a set of bearing elements 118 mounted to the structural tubes 110. This combination of movable attachment elements can permit the seat bottom assembly 104 as a whole to slide forward and aft with respect to the frame 108. Depending on the shape of the aft support assemblies 114 and forward tracked ramps 126, the sliding motion may also permit the seat bottom assembly 104 to tilt while actuating forward and aft, e.g., in a cradling motion.

In articulating embodiments, the concave surface 134 underneath the body 130 of the torque bearing attachment 122 may be shaped to provide clearance over the structural tubes 110 as the seat bottom assembly 104 articulates. This clearance may be advantageous when, for example, components of an existing non-articulating passenger seat are removed and replaced with an articulating seat bottom assembly that might not otherwise clear parts of the frame 108, structural tubes 110, or spreaders 112.

However, in various other embodiments, the seat bottom assembly 104 can be constrained to horizontal motion, or may be fixed in place with respect to the frame 108. Furthermore, alternative attachment points for the aft support assemblies 114 and forward bearing elements 118 can be used, e.g., by attachment of both or either assembly to the structural tubes 110, to the spreaders 112, or in some embodiments, even to the frame 108.

The elongate body 130 of the torque bearing attachment 122 may include a central portion formed of a truss-like cross-section having, e.g., a triangular or trapezoidal shape that is lightweight and resistant against bending. The reinforced bearing assemblies 150 may be attached to the ends of the elongate body 130 where the truss-like structure maximizes the strength of the torque bearing attachment 122, in order to prevent bending of the seat bottom assembly 104 during use.

The torque bearing attachment 122 may be formed of materials including but not limited to aluminum, stainless steel, aramid fibers, polycarbonate, polypropylene, other metallic materials, composite materials, or other similar materials, in accordance with various embodiments. In some specific embodiments, the torque bearing attachment 122 is formed of a strong and lightweight material that is suitable for manufacture primarily by extrusion (e.g., extrusion of the body 130 prior to supplemental machining or attachment of additional elements). Suitable extrusion-formable materials suitable for use in the torque bearing attachment 122 body 130 may include most metals (e.g., aluminum and aluminum alloys, magnesium and magnesium alloys, steel, etc.) and various high-strength polymers. Other structural elements, such as but not limited to the seat bottom panel 120, may be formed of any of the materials described above. According to various embodiments, the seat bottom panel 120 can be a composite (e.g. a polymer/polymer composite, or metal/polymer composite), and in particular may be a sandwich panel composite having a structured lightweight core and relatively thin face sheets (e.g., 0.25 cm to 2.5 cm) formed of stiff polymer, metal, and/or composite sheets. The seat bottom panel 120 is preferably from 0.5 to 1.5 cm thick.

Figure 2A:
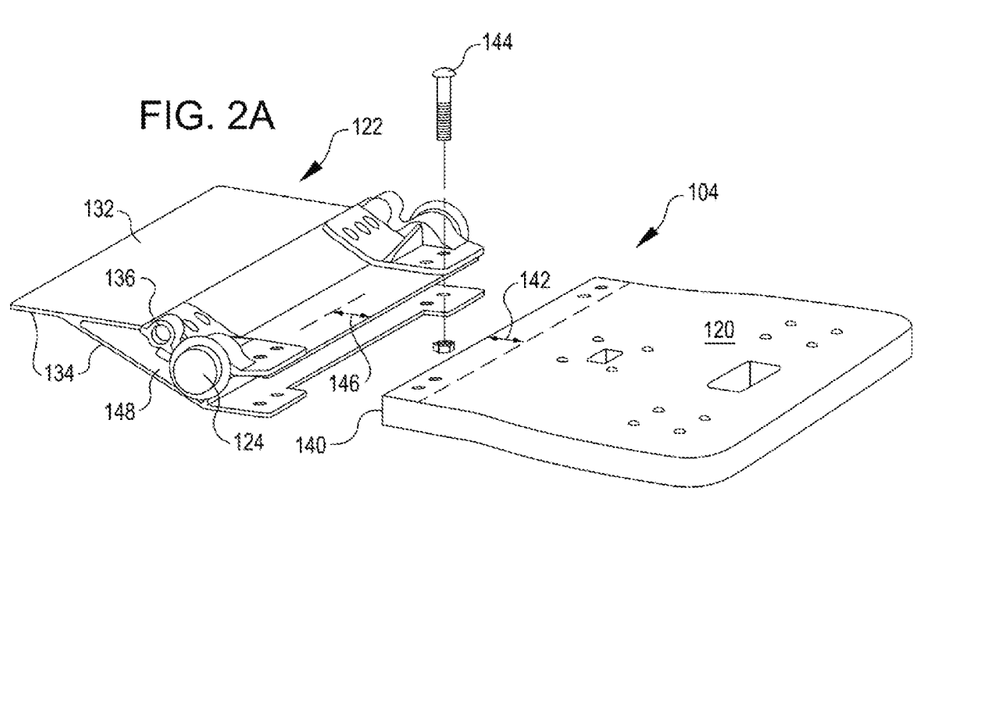
FIG. 2A is a perspective view showing the torque bearing seat pan assembly of FIG. 1 disconnected from the seat bottom panel.

FIG. 2A is a perspective view showing the torque bearing attachment 122 of the seat bottom assembly 104 of FIG. 1 disconnected from the seat bottom panel 120. According to various embodiments, the seat bottom panel 120 can be connected with the torque bearing attachment 122 by sliding an aft end 140 of the seat bottom panel 120 into a channel 128 in a forward end of the torque bearing attachment 122. The channel 128 has a depth 146 that preferably matches or exceeds an insertion length 142 of the seat bottom panel 120. According to various embodiments, the insertion length 142 may vary from about 0.635 cm to 6.35 cm, or preferably from 1 cm to 5 cm. The seat bottom panel 120 can be secured in the channel 128 by way of one or multiple connectors 144 (e.g. bolts, screws, rivets, and the like) or other suitable connecting means, such as clamping, adhesive, or the like. The interaction of the seat bottom panel 120 with the channel 128 can provide sufficient torsional stiffness to the connection for supporting a passenger, but in some embodiments, additional reinforcing elements may be used.

Figure 2B:
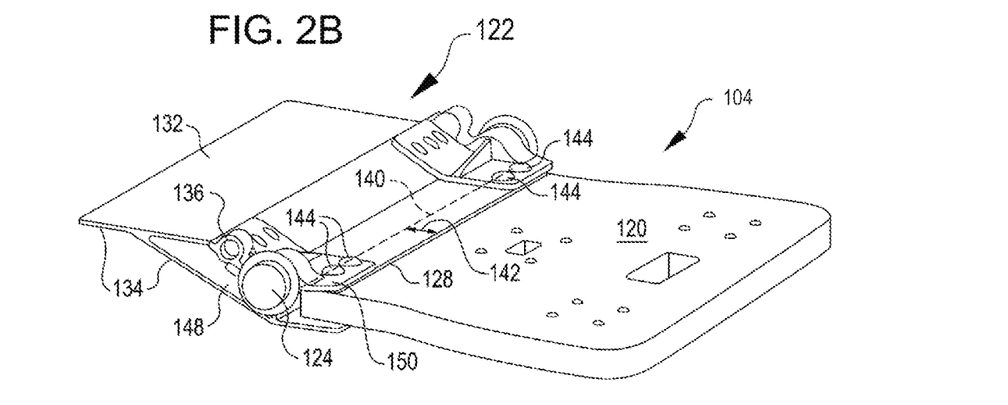
FIG. 2B is a perspective view showing the torque bearing seat pan assembly of FIG. 1 connected with the seat bottom panel in greater detail.

The side ends of the torque bearing attachment 122 can include most of the hardware for connection of the seat bottom assembly 104 with a passenger seat frame and seat back, including, e.g., the aft bearing elements 124 and attachment elements 136 for connecting the seat bottom assembly with a reclinable seat back. These structural features can be connected with the torque bearing attachment 122 adjacent a truss-like conduit 148 that may run a length of the attachment, and that provides much more structural rigidity to the torque bearing attachment than would be provided by a flat part, or by the seat bottom panel 120. The torque bearing attachment 122 narrows at an aft end thereof, forming a concave surface 134 that is shaped to clear elements of a passenger seat frame and to permit installation of the seat bottom assembly 104 in close proximity to other structural elements of a passenger seat. FIG. 2B is a perspective view showing the torque bearing attachment 122 of FIG. 2A connected with the seat bottom panel 120 in greater detail, together forming the seat bottom assembly 104.

Figure 3A:
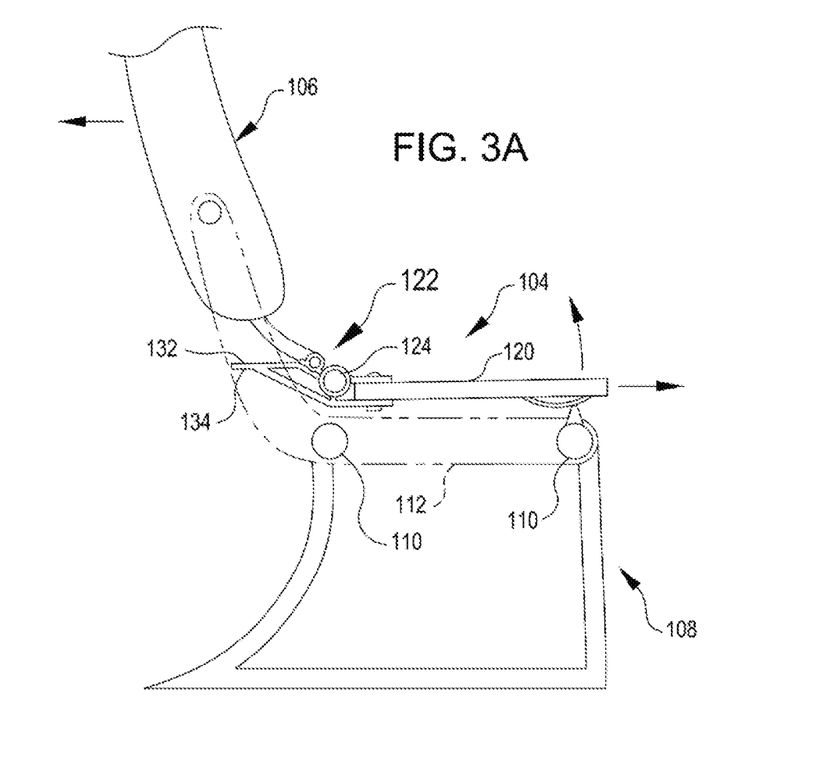
FIG. 3A is a simplified side view showing the seat pan and torque bearing seat pan assembly of FIG. 1 in an upright configuration.
Figure 3B:
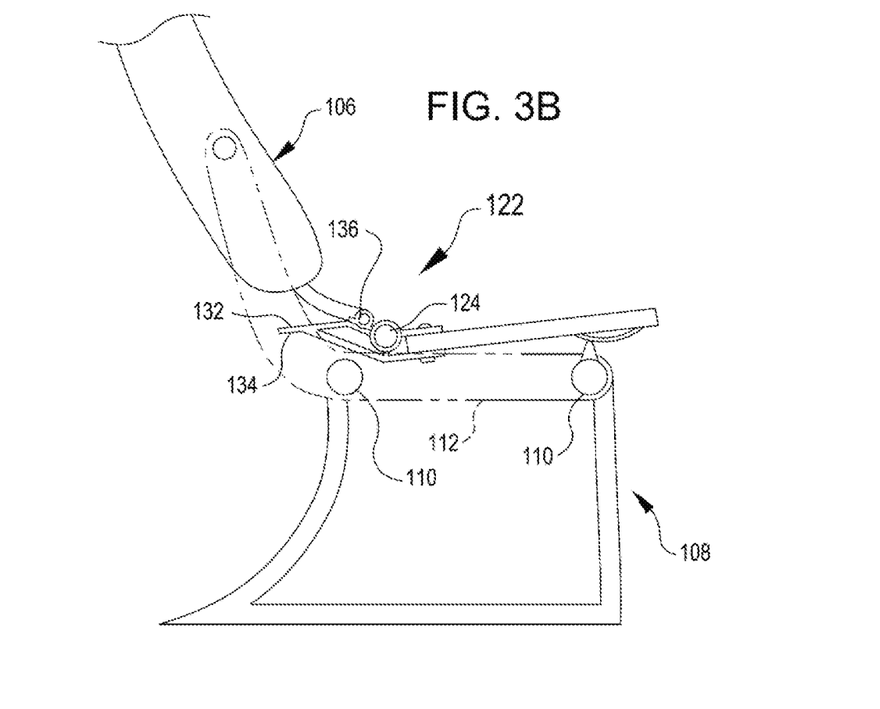
FIG. 3B is a simplified side view showing the seat pan and torque bearing seat pan assembly of FIG. 1 in a reclined position, with attention to the seat pan clearance.

As described above, the shape of the torque bearing attachment 122 is selected so that the seat bottom assembly 104, when complete and when attached to a passenger seat frame, is able to clear elements of the passenger seat frame when static or, in the case of actuating seat bottom assemblies, when the seat bottom assembly is actuated by a passenger. For example, FIG. 3A and FIG. 3B illustrate the clearance by a seat bottom assembly 104 of such structural elements in the course of an articulating/reclining motion. As shown in FIG. 3A, in an upright configuration, the seat bottom panel 120 and torque bearing attachment 122 of the seat bottom assembly 104 are above and clear of structural features such as, but not limited to, the structural tubes 110. During a recline action, as shown in FIG. 3B, the seat back assembly 106 reclines backward while the seat bottom assembly 104 articulates forward and tilts aft. This articulating motion would impinge on the structural tube 110, but for the concave surface 134 underneath the torque bearing attachment 122 moving along and clearing the structural tube. The specific shape of the concave surface 134 can be varied according to the exact dimensions of the seat to which the torque bearing attachment 122 is intended, and the amount of clearance desired.

Figure 4:
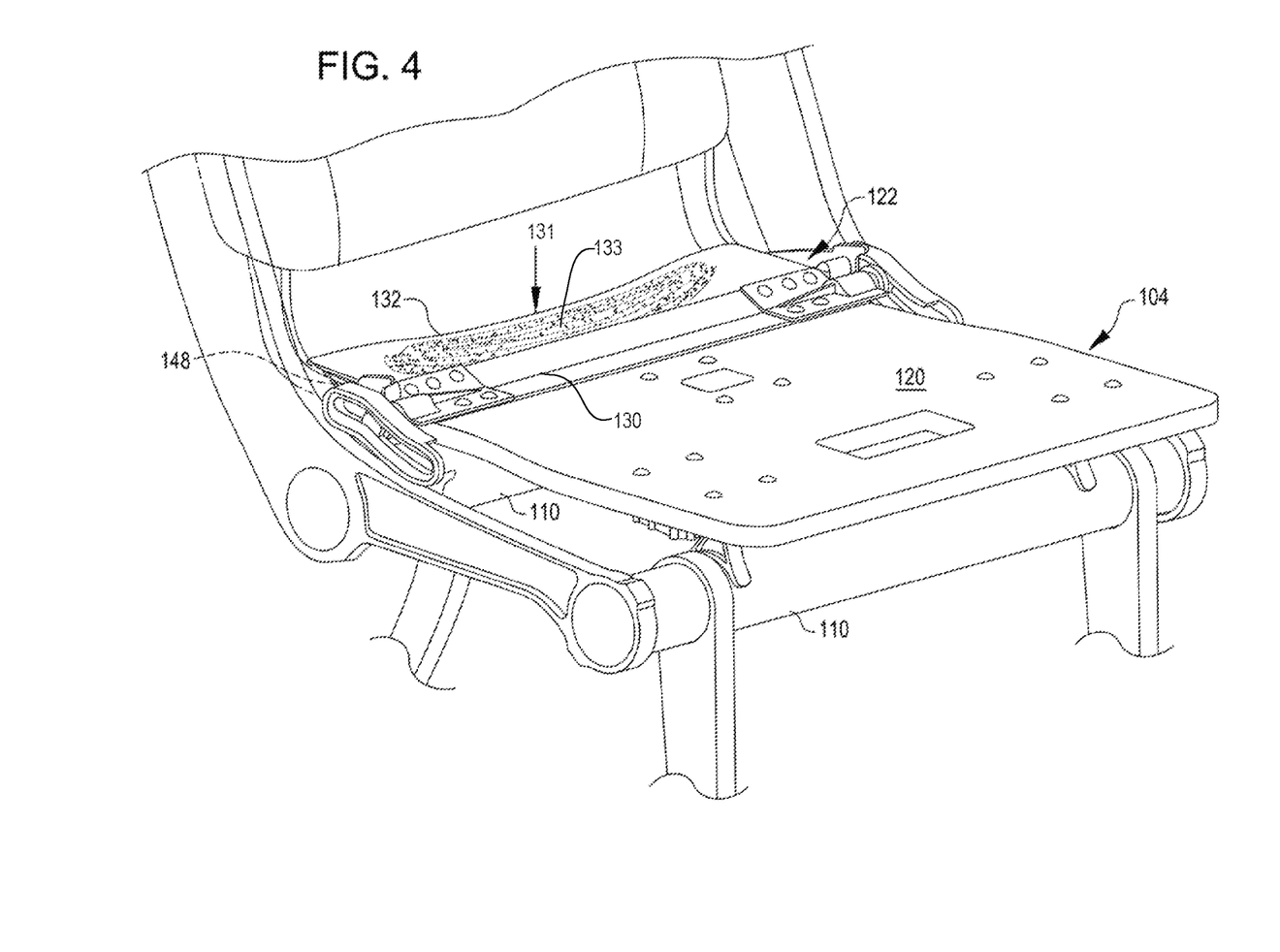
FIG. 4 is a simplified perspective view showing the passenger seat of FIG. 1 with an applied force, and illustrating stresses absorbed by the torque bearing seat pan assembly.

The torque bearing attachments 122 described herein provide a modular solution for retrofitting seat bottom assemblies to existing seat frames with limited clearance, and for improved strength of the seat bottom assemblies at their connection points to the seat frames (e.g., at their bearing elements). However, the torque bearing attachments 122 also provide greater resilience against local stresses than existing seat bottom designs. For example, as shown in FIG. 4, seat bottom assemblies 104 may be subjected to localized stresses at certain locations, such as along an aft platform 132. Some causes of point stress on a seat bottom assembly 104 may include dropped objects, kneeling or standing on a seat bottom from behind the seat. FIG. 4 illustrates an example of a point force 131 exerted on the aft platform 132 of the torque bearing attachment 122, and an exaggerated strain response 133 shows how stresses on the seat bottom assembly 104 are absorbed by the torque bearing attachment 122 without being translated into the seat bottom panel 120. In particular, the truss-like conduit 148 of the body 130 of the torque bearing attachment 122 is resilient against bending. In some embodiments, e.g. where the torque bearing attachment 122 is metal, the aft platform 132 may be able to reversibly bend in response to local stress, thus absorbing force with minimal risk of failure.

Figure 5:
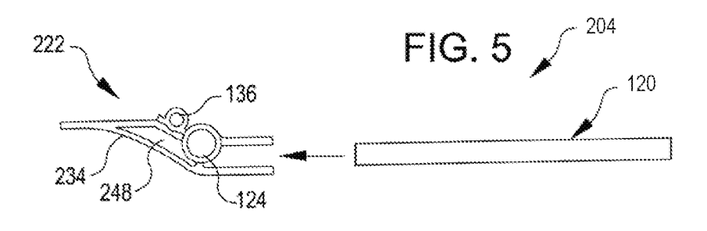
FIG. 5 is side section view showing a second example of a torque bearing seat pan assembly with a curved profile.
Figure 6:
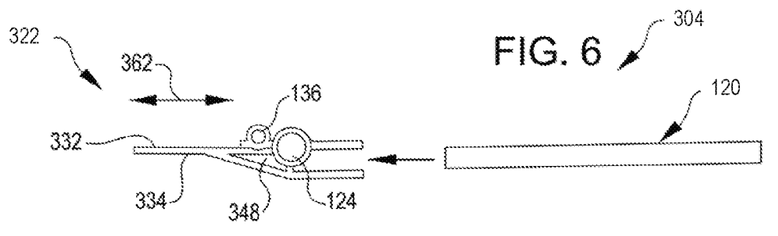
FIG. 6 is a side section view showing a third example of a torque bearing seat pan assembly with an increased clearance relative to the torque bearing seat pan assembly shown in FIG. 1.
Figure 7:
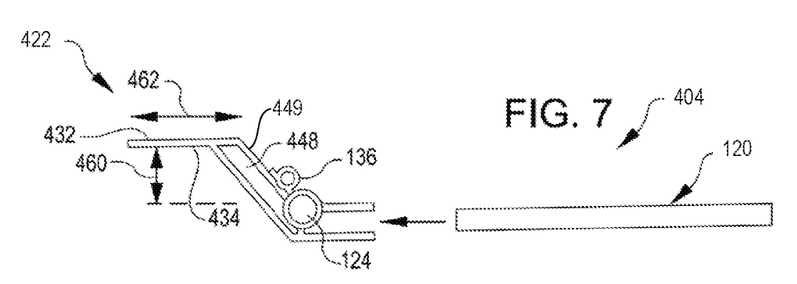
FIG. 7 is a side section view showing a fourth example of a torque bearing seat pan assembly with decreased clearance relative to the torque bearing seat pan assembly shown in FIG. 1.

The elongate body 130 of the torque bearing attachment 122 can be formed in a variety of shapes configured to tune the strength, weight, and clearance (i.e. the shape of the concave surface 134) underneath the assembly. Several examples of alternative torque bearing assemblies are illustrated in FIGS. 5-7, which are interchangeably attachable with the seat bottom panel 120. However, it will be understood that other shapes are possible without deviating from this disclosure. According to various embodiments, the body 130 of the torque bearing attachment 122 is an extrudable shape that can be cheaply produced from a formable or ductile medium and cut to any suitable desired length; but in some embodiments, the body 130 can be formed by casting or molding, formed as a composite, or machined.

FIG. 5 is side section view showing a second example of a torque bearing attachment 222 with a curved profile connected with a seat bottom panel 120 to from seat bottom assembly 204. In accordance with at least some embodiments, the torque bearing attachment 222 includes a hollow truss-like conduit 248 with at least one curved wall coinciding with the curved concave surface 234 that is shaped to clear structural elements of a passenger seat such as the passenger seat 102 shown in FIG. 1. A curved concave surface 234 can be fine-tuned based on the path by which the seat bottom assembly 204 actuates.

FIG. 6 is a side section view showing a third example of a torque bearing attachment 322 with an flattened profile connected with a seat bottom panel 120 to form seat bottom assembly 304. In accordance with at least one embodiment, the hollow truss-like conduit 348 can be reduced in size and/or changed in shape in order to minimize the rise of the aft portion 332 of the attachment. The concave surface 334 can vary in shape by changing the size of the hollow truss-like conduit 348, and can have any suitable depth 362 depending on the required depth of the seat bottom assembly 304.

FIG. 7 is a side section view showing a fourth example of a torque bearing attachment 422 with an elevated profile connected with a seat bottom panel 120 to form seat bottom assembly 404. In accordance with at least one embodiment, the hollow truss-like conduit 448 can be increased in length, dimension, or slope in shape in order to vary the amount of rise 460 of the aft portion 432 of the attachment, as well as the depth 462 thereof. The concave surface 434 can vary in shape by changing the size and shape of the hollow truss-like conduit 448. A torque bearing attachment can have any suitable rise 460 as needed based on the shape desired for the seat bottom assembly, or the clearance required beneath the seat bottom assembly. In some embodiments, the rise 460 of the aft portion 432 of the torque bearing attachment 422 can vary from between 0 cm and 5 cm, though other dimensions are possible within the scope of this disclosure. According to some embodiments, the sloped portion 449 can have a length from 0 cm (no rise, e.g. FIG. 6) up to 7.5 cm.

Figure 8:
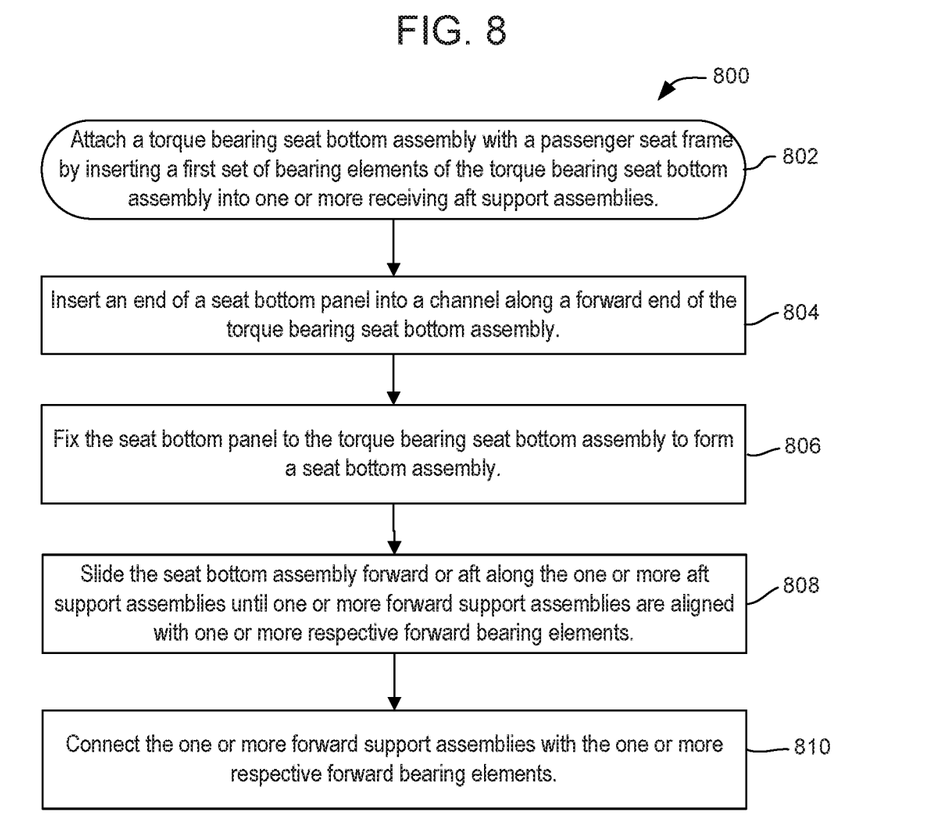
FIG. 8 illustrates an example process for assembling a torque bearing seat pan assembly with a seat bottom panel of a passenger seat.

The seat bottom assemblies described herein, formed by assembly of the torque bearing attachment (e.g. attachment 122, FIG. 1) and seat bottom panels (e.g. seat bottom panel 120, FIG. 1), may also permit simplified assembly or retrofit of the seat bottom assemblies into existing passenger seats or to seat frames. For example, FIG. 8 illustrates a first process 800 for assembling a seat bottom assembly with a torque bearing attachment and seat bottom panel, in accordance with various embodiments. First, a torque bearing attachment of a passenger seat bottom assembly can be attached with a passenger seat frame by inserting a first set of bearing elements of the torque bearing seat bottom assembly into one or more receiving aft support assemblies. (Act 802) An aft end of a seat bottom panel can then be inserted into a channel along a forward end of the torque bearing attachment. (Act 804) Note that in some alternative embodiments, the assembly of the seat bottom panel can precede assembly of the torque bearing attachment with the seat frame. When the seat bottom panel and attachment are connected together, and further connected with the frame as described above, the seat bottom assembly can be moved forward or aft by sliding the bearing elements along the one or more aft support assemblies until one or more forward support assemblies are aligned with one or more respective forward bearing elements. (Act 806) The seat bottom assembly can then be further attached with the frame by mating the forward support assemblies with the forward bearing elements, which can include, e.g., inserting bearing elements into openings in a ramp or track. (Act 808) The seat bottom assembly can then be secured in place with respect to the frame by, e.g., pinning the bearing elements in place with respect to the forward support assemblies or moving the seat bottom assembly to a position or range of positions where backout of the bearing elements from the respective support assemblies is prevented.

The process 800 (or any other processes described herein, or variations, and/or combinations thereof) may be automated and performed mechanically under the control of one or more computer systems configured with executable instructions and implemented as code (e.g., executable instructions, one or more computer programs, or one or more applications executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, aspects of process 900 may be performed manually.

In the following, further examples are described to facilitate the understanding of the invention:

Example A. A torque bearing attachment for a passenger seat, the attachment comprising:
  an elongated body comprising a hollow conduit, a flat upper surface, and a concave lower surface;
  a first bearing element configured for connecting the torque bearing attachment with a passenger seat frame and connected with the elongated body at a first end of the elongated body;
  a second bearing element configured for connecting the torque bearing attachment with the passenger seat frame and connected with the elongated body at a second end of the elongated body opposite the first end; and
  one or more connecting features positioned at a forward edge of the elongated body between the first end and second end, and configured to receive an aft end of a seat bottom panel.

Example B. The torque bearing attachment of example A, wherein the elongated body further comprises a ramped upper surface from the forward edge to the flat upper surface, and wherein the flat upper surface terminates at an aft edge of the elongated body.

Example C. The torque bearing attachment of example A or example B, wherein the elongated body comprises a trussed construction comprising at least three integrally joined or coextruded elongate panels configured to resist bending.

Example D. The torque bearing attachment of any one of the preceding examples, wherein the elongated body comprises an extruded structural member connected with the first and second bearing elements.

Example E. The torque bearing attachment of any one of the preceding examples, wherein the forward edge of the elongated body comprises a channel sized to receive the aft end of the seat bottom panel to a nonzero depth.

Example F. The torque bearing attachment of example E, wherein the nonzero depth is preferably in a range of 0.635 cm to 6.35 cm Example G. The torque bearing attachment of any one of the preceding examples, wherein:
  the first bearing element comprises a first bearing configured to movably mate with a first receiving element of the passenger seat frame; and
  the second bearing element comprises a second bearing configured to movably mate with a second receiving element of the passenger seat frame.

Example H. The torque bearing attachment of any one of examples A-F, wherein:
  the first bearing element comprises a first roller configured to be received in a first roller track connected with the passenger frame; and
  the second bearing element comprises a second roller configured to be received in a second roller track connected with the passenger frame.

Example I. The torque bearing attachment of any one of the preceding
  examples, further comprising the seat bottom panel connected with the elongated body at the forward edge of the elongated body, wherein the seat bottom panel comprises a substantially flat composite panel.

Example J. A passenger seat, comprising:
a seat frame; and
a seat bottom assembly connected with the seat frame, the seat bottom assembly comprising:
  a torque bearing attachment comprising an elongated body comprising a hollow conduit, a flat upper surface, and a concave lower surface;
  a first bearing element at a first end of the elongated body connecting the torque bearing attachment with the seat frame;
  a second bearing element at a second end of the elongated body opposite the first end and connecting the torque bearing attachment with the seat frame; and
  a substantially flat seat bottom panel connected with a forward edge of the elongated body.

Example K. The passenger seat of example J, wherein the first bearing element and second bearing element comprise rotating connectors configured to permit the seat bottom assembly to pivot with respect to the seat frame.

Example L. The passenger seat of example J or example K, wherein:
the seat frame further comprises a first roller track and a second roller track positioned proximate an aft end of the seat bottom assembly; and
the first bearing element and second bearing element comprise respective first and second rollers that mate with the first roller track and second roller track and permit the seat bottom assembly to articulate forward and aft by the first and second rollers rolling on the first and second roller tracks.

Example M. The passenger seat of example L, wherein the elongated body comprises a ramped shape from the forward edge of the elongated body to an aft edge of the elongated body, the ramped shape configured to clear the seat frame when the seat bottom assembly articulates forward or aft.

Example N. The passenger seat of example L or example M, wherein the first roller track and second roller track are configured to cause the first roller and the second roller, respectively, to move downward when the seat bottom assembly articulates forward, and to move upward when the seat bottom assembly moves aft, such that the seat bottom assembly tilts in response to being moved forward and levels in response to being moved aft.

Example O. The passenger seat of any one of the preceding examples, further comprising a seat back assembly comprising a seat back and a mechanical linkage connected with a lower extent of the seat back, the mechanical linkage pivotally connected with the torque bearing attachment such that, when the seat back assembly actuates, the seat bottom assembly actuates in tandem with the seat back assembly.

Example P. The passenger seat of example P, wherein the mechanical linkage comprises a first mechanical fuse and a second mechanical fuse, the first and second mechanical fuses connected with the torque bearing attachment at the first end of the elongated body and at the second end of the elongated body, respectively.

Example Q. A method of installing a seat bottom assembly in a passenger seat, the method comprising:
with a torque bearing attachment comprising an elongated body comprising a channel along a forward edge of the elongated body, a first bearing element connected with the elongated body at a first end of the elongated body, and a second bearing element connected with the elongated body at a second end of the elongated body opposite the first end;
partially inserting a substantially planar seat bottom panel into the channel of the forward edge of the elongated body of the torque bearing assembly; and
connecting the assembled torque bearing attachment and seat bottom panel with a frame of the passenger seat by attaching the first bearing element with a first receiving element connected to the frame and by attaching the second bearing element with a second receiving element connected to the frame.

Example R. The method of example Q, further comprising: securing the seat bottom panel to the elongated body of the torque bearing attachment by installing one or more connectors through the seat bottom panel and one or more flanged elements of the channel along the forward edge.

Example S. The method of example Q or example R, wherein:
the first bearing element and the second bearing element comprise respective first and second rollers;
the first receiving element and the second receiving element comprise respective first and second roller tracks configured to receive the first and second rollers, respectively; and
connecting the assembled torque bearing attachment and seat bottom panel with the frame of the passenger seat comprises mating the first bearing element and second bearing element with the first roller track and second roller track, respectively.

Example T. The method of any one of the preceding examples, further comprising: attaching a mechanical linkage with both of a lower extent of a reclinable seat back and with the seat bottom assembly by connecting the mechanical linkage with one or both of the first end of the torque bearing attachment and the second end of the torque bearing attachment.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A torque bearing attachment for a passenger seat, the attachment comprising:
an elongated body comprising a hollow conduit, a flat upper surface, and a concave lower surface;
a first bearing element configured for connecting the torque bearing attachment with a passenger seat frame and connected with the elongated body at a first end of the elongated body;
a second bearing element configured for connecting the torque bearing attachment with the passenger seat frame and connected with the elongated body at a second end of the elongated body opposite the first end; and
one or more connecting features positioned at a forward edge of the elongated body between the first end and second end, and configured to receive an aft end of a seat bottom panel.

2. The torque bearing attachment of claim 1, wherein the elongated body further comprises a ramped upper surface from the forward edge to the flat upper surface, and wherein the flat upper surface terminates at an aft edge of the elongated body.

3. The torque bearing attachment of claim 1, wherein the elongated body comprises a trussed construction comprising at least three integrally joined or coextruded elongate panels configured to resist bending.

4. The torque bearing attachment of claim 1, wherein the elongated body comprises an extruded structural member connected with the first and second bearing elements.

5. The torque bearing attachment of claim 1, wherein the forward edge of the elongated body comprises a channel sized to receive the aft end of the seat bottom panel to a nonzero depth.

6. The torque bearing attachment of claim 5, wherein the nonzero depth is preferably in a range of 0.635 cm to 6.35 cm.

7. The torque bearing attachment of claim 1, wherein:
the first bearing element comprises a first bearing configured to movably mate with a first receiving element of the passenger seat frame; and
the second bearing element comprises a second bearing configured to movably mate with a second receiving element of the passenger seat frame.

8. The torque bearing attachment of claim 1, wherein:
the first bearing element comprises a first roller configured to be received in a first roller track connected with the passenger seat frame; and
the second bearing element comprises a second roller configured to be received in a second roller track connected with the passenger seat frame.

9. The torque bearing attachment of claim 1, further comprising the seat bottom panel connected with the elongated body at the forward edge of the elongated body, wherein the seat bottom panel comprises a substantially flat composite panel.

10. A passenger seat, comprising:
a seat frame; and
a seat bottom assembly connected with the seat frame, the seat bottom assembly comprising:
  a torque bearing attachment comprising an elongated body comprising a hollow conduit, a flat upper surface, and a concave lower surface;
  a first bearing element at a first end of the elongated body connecting the torque bearing attachment with the seat frame;
  a second bearing element at a second end of the elongated body opposite the first end and connecting the torque bearing attachment with the seat frame; and
  a substantially flat seat bottom panel connected with a forward edge of the elongated body.

11. The passenger seat of claim 10, wherein the first bearing element and second bearing element comprise rotating connectors configured to permit the seat bottom assembly to pivot with respect to the seat frame.

12. The passenger seat of claim 10, wherein:
the seat frame further comprises a first roller track and a second roller track positioned proximate an aft end of the seat bottom assembly; and
the first bearing element and second bearing element comprise respective first and second rollers that mate with the first roller track and second roller track and permit the seat bottom assembly to articulate forward and aft by the first and second rollers rolling on the first and second roller tracks.

13. The passenger seat of claim 12, wherein:
the elongated body comprises a ramped shape from the forward edge of the elongated body to an aft edge of the elongated body, the ramped shape configured to clear the seat frame when the seat bottom assembly articulates forward or aft.

14. The passenger seat of claim 12, wherein the first roller track and second roller track are configured to cause the first roller and the second roller, respectively, to move downward when the seat bottom assembly articulates forward, and to move upward when the seat bottom assembly moves aft, such that the seat bottom assembly tilts in response to being moved forward and levels in response to being moved aft.

15. The passenger seat of claim 10, further comprising:
a seat back assembly comprising a seat back and a mechanical linkage connected with a lower extent of the seat back, the mechanical linkage pivotally connected with the torque bearing attachment such that, when the seat back assembly actuates, the seat bottom assembly actuates in tandem with the seat back assembly.

16. The passenger seat of claim 15, wherein the mechanical linkage comprises a first mechanical fuse and a second mechanical fuse, the first and second mechanical fuses connected with the torque bearing attachment at the first end of the elongated body and at the second end of the elongated body, respectively.

17. A method of installing a seat bottom assembly in a passenger seat, the method comprising:
a torque bearing attachment comprising an elongated body comprising a channel along a forward edge of the elongated body, a first bearing element connected with the elongated body at a first end of the elongated body, and a second bearing element connected with the elongated body at a second end of the elongated body opposite the first end;
partially inserting a substantially planar seat bottom panel into the channel of the forward edge of the elongated body of the torque bearing assembly; and
connecting the assembled torque bearing attachment and seat bottom panel with a frame of the passenger seat by attaching the first bearing element with a first receiving element connected to the frame and by attaching the second bearing element with a second receiving element connected to the frame.

18. The method of claim 17, further comprising:
securing the seat bottom panel to the elongated body of the torque bearing attachment by installing one or more connectors through the seat bottom panel and one or more flanged elements of the channel along the forward edge.

19. The method of claim 17, wherein:
the first bearing element and the second bearing element comprise respective first and second rollers;
the first receiving element and the second receiving element comprise respective first and second roller tracks configured to receive the first and second rollers, respectively; and
connecting the assembled torque bearing attachment and seat bottom panel with the frame of the passenger seat comprises mating the first bearing element and second bearing element with the first roller track and second roller track, respectively.

20. The method of claim 17, further comprising:
attaching a mechanical linkage with both of a lower extent of a reclinable seat back assembly of the passenger seat and with the torque bearing attachment such that, when the seat back assembly actuates, the seat bottom assembly actuates in tandem with the seat back assembly.

* * * * *